June 30, 1925.

A. M. SOSA 1,544,521

METHOD OF BALANCING AND APPARATUS THEREFOR

Filed July 3, 1922 3 Sheets-Sheet 1

INVENTOR:

June 30, 1925.
A. M. SOSA
1,544,521
METHOD OF BALANCING AND APPARATUS THEREFOR
Filed July 3, 1922 3 Sheets-Sheet 2
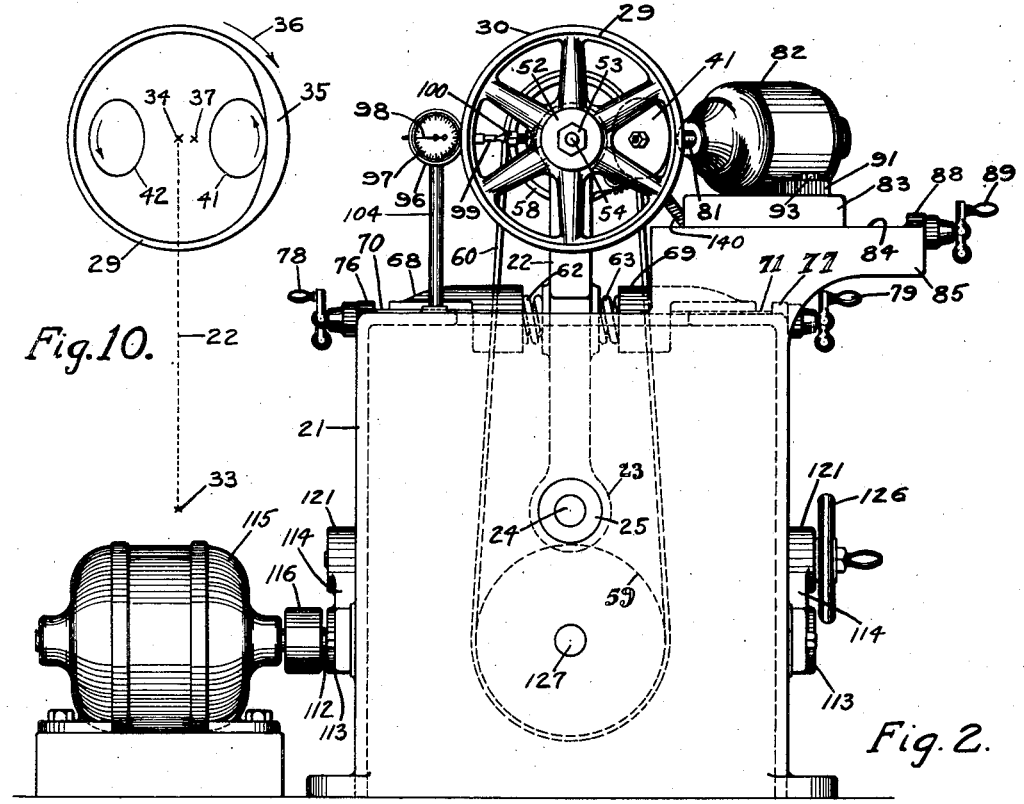
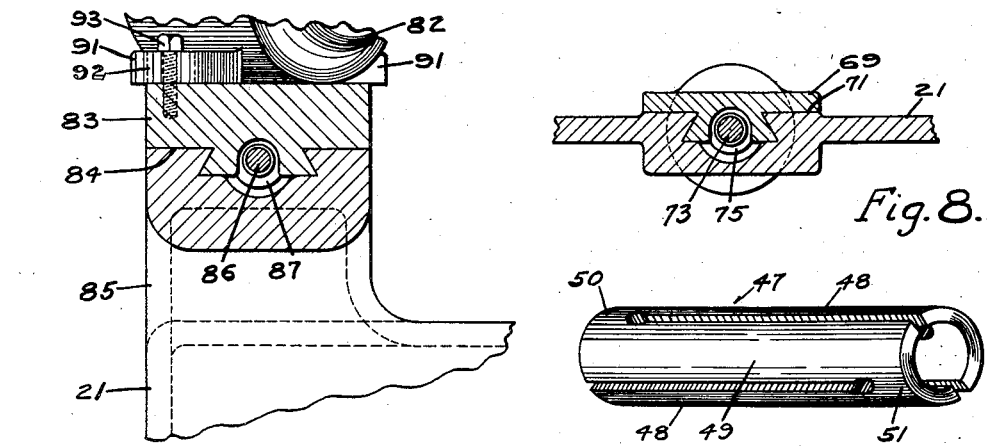
INVENTOR
Augustus M. Sosa,

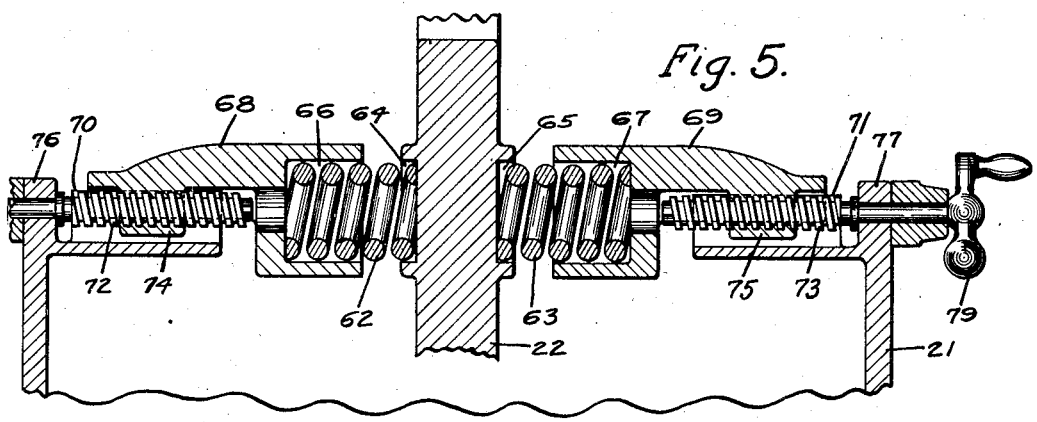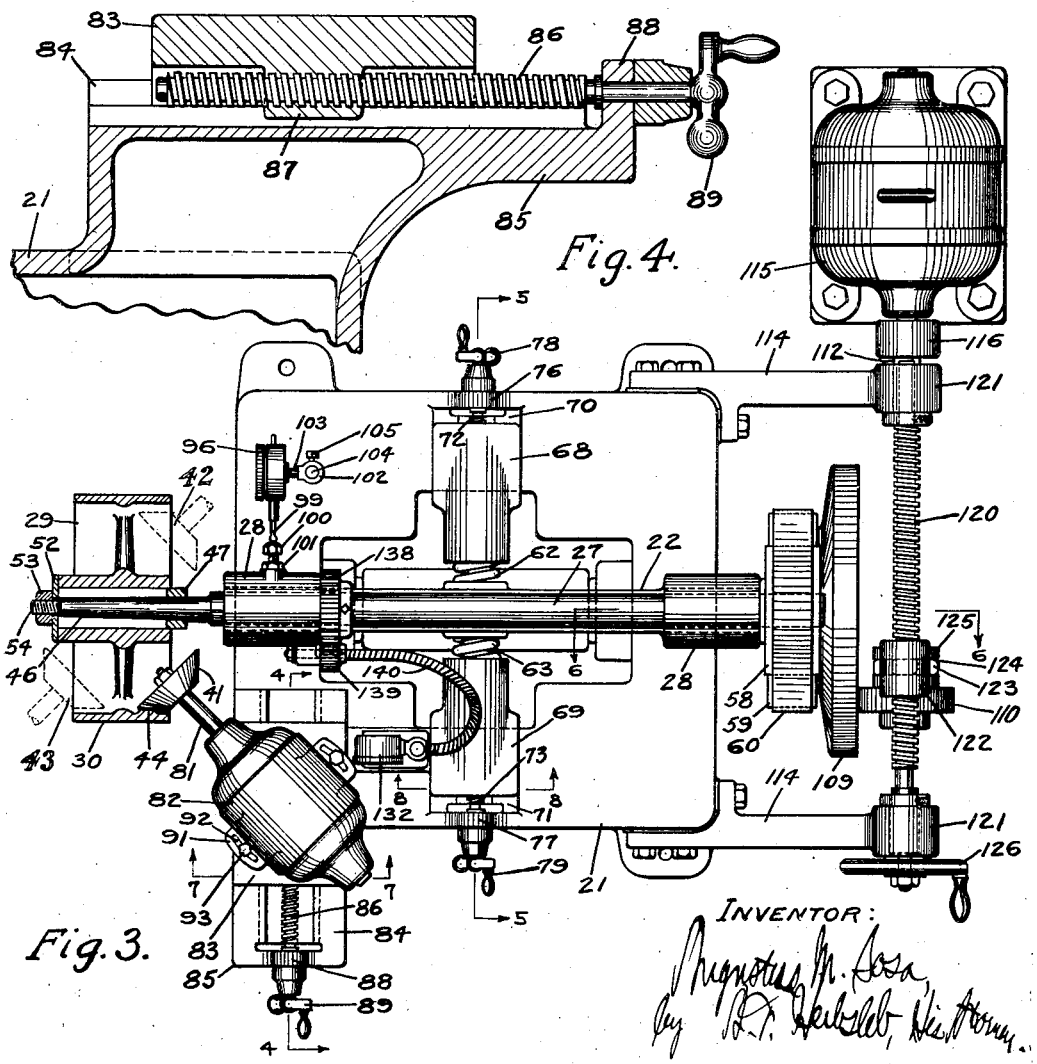

Patented June 30, 1925.

1,544,521

UNITED STATES PATENT OFFICE.

AUGUSTUS M. SOSA, OF CINCINNATI, OHIO, ASSIGNOR OF ONE-HALF TO AUGUST F. HERBSLEB, OF CINCINNATI, OHIO.

METHOD OF BALANCING AND APPARATUS THEREFOR.

Application filed July 3, 1922. Serial No. 572,720.

*To all whom it may concern:*

Be it known that I, AUGUSTUS M. SOSA, a citizen of the United States, residing at Cincinnati, in the county of Hamilton and State of Ohio, have invented certain new and useful Improvements in Methods of Balancing and Apparatus Therefor, of which the following is a specification.

It is the object of my invention to provide a new and improved method for balancing objects which are rotated in use, and especially for balancing objects by reducing the inner peripheries thereof.

It is the object of my invention, further, to provide a new and improved method of balancing an object by reducing the heavier side thereof during rotation of the object being balanced; further, to provide a new and improved method of balancing an object by reducing the heavier side thereof at the inner periphery of the object by causing rotation of the object in such a manner as to urge its center of gravity toward a fixed axis of rotation, that is, toward what would be the normal axis of rotation if the object were in balanced condition; further, to rotate the object being balanced and imparting movements thereto lateral to its axis of rotation and causing said lateral movements to impart contact between the objects being balanced and a reducing tool; and, further, to cause such contact between said reducing tool and the object being balanced to take place at the inner periphery of the heavier portion of said object.

My invention consists, further, in a machine in which the object being balanced is rotated, and means whereby the unbalanced condition of the object causes lateral movements thereof, and reducing means so placed as to cause contact between the heavier portion of the object and said reducing tool; further, to provide means whereby said contact takes place at the inner periphery of said object; further, to provide resilient means for resisting such lateral movements; further, to provide gaging means for such lateral movements; further, to provide means for regulating the speeds of rotation of said object; and, further, to provide gaging means for said speeds of rotation.

The invention will be further readily understood from the following description and claims, and from the drawings, in which latter:

Fig. 2 is an end elevation of the same.

Fig. 3 is a plan view of the same.

Fig. 4 is a detail of the tool-supporting means, shown in section on the line 4—4 of Fig. 3.

Fig. 5 is a detail of the means for controlling the lateral movements of the mandrel, shown in cross-section on the line 5—5 of Fig. 3.

Figure 1:
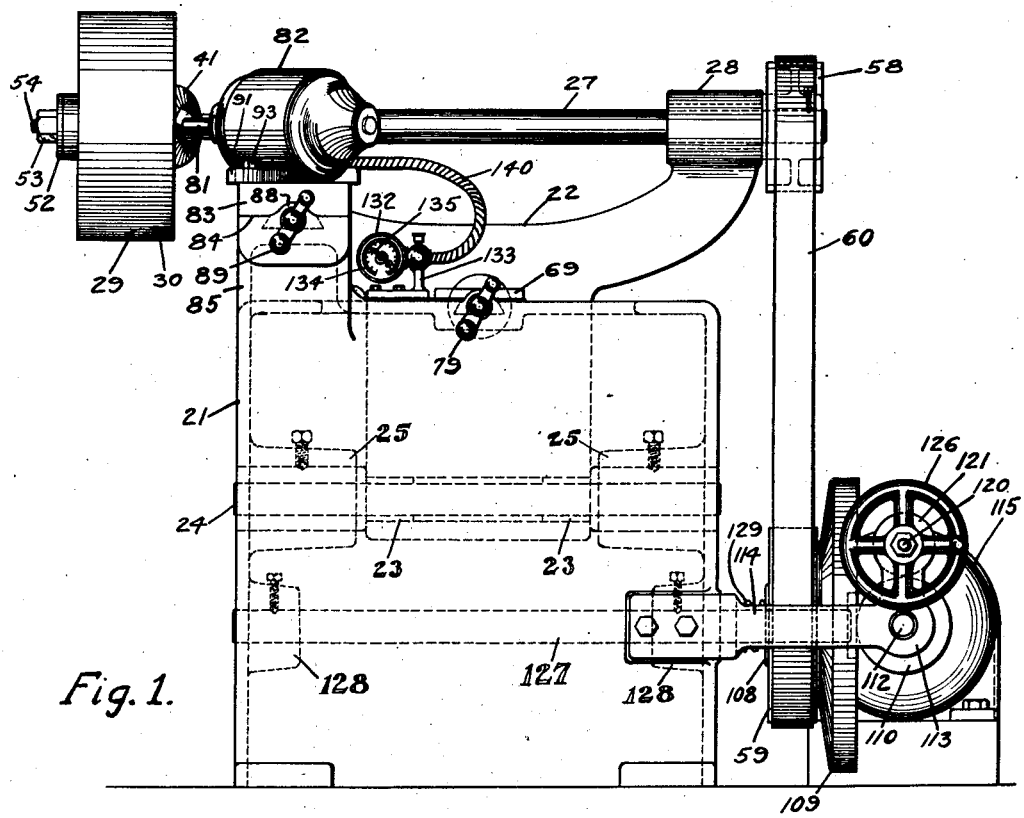
Fig. 1 is a side elevation of a machine exemplifying my invention.
Figure 6:
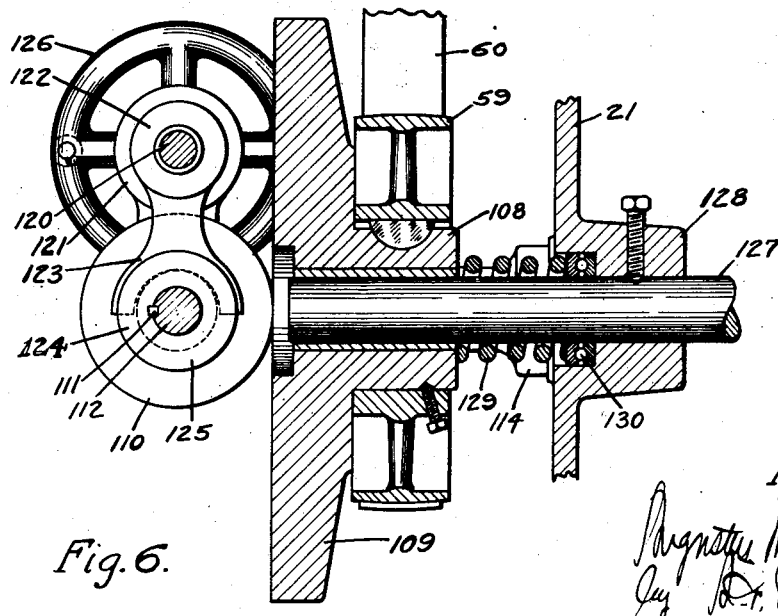

Sig. 6 is a detail of the driving means, shown in section on the line 6—6 of Fig. 3.

Fig. 7 is a cross-sectional detail of the adjusting means for the tool, taken on the line 7—7 of Fig. 3.

Fig. 8 is a cross-sectional detail of the adjusting means for lateral control of the mandrel, taken on the line 8—8 of Fig. 3.

Fig. 9 is a perspective detail, showing the expansion sleeve for the mandrel; and, Fig. 10 is a diagrammatic representation of the principle of operation of my invention.

The frame of the machine is shown at 21 and supports a laterally movable member, shown as a rockable frame 22, which is rockingly supported by bearings 23 on a shaft 24, fixed in bearings 25 in the main frame, although the movable frame may be hung or otherwise supported.

A rotatable member is provided with means for securing an object to be balanced thereon. This object is shown as a pulley 29. The rotatable member is shown as a mandrel 27 journaled in the rockable frame, in bearings 28 thereof.

Pulleys are usually finished at their outer peripheries either with a so-called straight face 30, or with a well-known crown face; and the pulleys, after having their outer peripheries thus finished, are usually balanced, as by drilling holes therein or affixing pieces to the same.

By means of that form of my invention exemplified in the drawings that portion of the object being balanced which is heavier to cause unbalancing, is reduced at its inner periphery while the object is being rotated, preferably at a speed slightly higher than the speed at which the object is intended to rotate during use.

I have found that when rotating an object movably held under restraint in a given plane or arc there is a tendency for the center of gravity of the object to seek a fixed center of rotation. When now an object which is heavier at one portion of its circumference is being rotated when so held, its center of gravity will be at that side of its fixed axis of rotation at which such heavier portion is momentarily located, and, if the object be permitted to shift under influence of the centrifugal force of its unbalanced condition, the center of gravity will move toward said fixed axis.

A reducing tool exemplified as a grinding wheel 41, is caused to act on the heavier portion of the object being balanced as this heavier portion moves laterally toward the normal axis of rotation of the object, thereby gradually reducing the weight of this heavier portion of the object, whereby approach between the center of gravity of the object and its normal or fixed axis of rotation is caused, and when coincidence between said center of gravity and axis of rotation has been reached, the object is balanced.

I have exemplified a reducing tool acting on the inner periphery of the heavier portion of the object at one of its inner paths, namely, its descending path. If desired, another reducing tool, indicated by the dotted lines 42, may be provided at the opposite or ascending path of such heavier portion, the position of which latter reducing tool, exemplified as a grinding wheel, may be adjusted by means similar to those for adjusting the positions of the grinding wheel 41, or the reducing tools may be simultaneously adjusted by connecting said adjusting means. If desired, the additional reducing tool may be placed at the opposite end of the object, as indicated by the grinding wheel shown in dotted lines at 43.

The heavier portion of the object being balanced is exemplified as due to a lump 44 at its inner periphery.

Explaining my invention, and referring to Fig. 10, it will be assumed that 33 represents the pivotal axis of the rockable frame 22, and that 34 represents the fixed axis or normal axis of rotation of the pulley 29, assuming the pulley to be balanced. The pulley is however out of balance, having the heavier portion 35 at the right side thereof, as the pulley is shown in the figure, the pulley rotating in the direction of the arrow 36. The center of gravity of the pulley, represented at 37, is therefore also at the right side of what will eventually be the fixed or normal axis of the pulley when balanced.

If the axis of rotation of the unbalanced pulley were held stationary, the center of gravity would rotate about said axis in a circular path with said axis at its center. The axis of rotation of the pulley is however not held stationary, but is permitted to move from side to side, influenced by said center of gravity. When the portion of the pulley of greater weight is moving downwardly at the right, there is an urge of the center of gravity to move toward the left, and when said portion of greater weight is moving upwardly at the left, there is an urge of the center of gravity to move toward the right. This may be likened to the urge of a spinning top to find a vertical axis.

At each movement of the pulley toward the left, said heavier portion is acted on by the grinding wheel 41, and at each movement of the pulley toward the right, said heavier portion is acted on by the grinding wheel 42. The lateral movements of the pulley cause said heavier portion to have a downward and an upward path inside the downward and upward paths of the opposite or lighter side of the pulley, moving said lighter side away from the grinding wheels, so that said lighter portion is not acted on by the grinding wheels.

When the action of the grinding wheel or wheels has been sufficient to balance the pulley, then the center of gravity and the axis of rotation coincide, placing the axis of rotation and the center of gyration in coincident lines.

The terms side and lateral and similar terms in this description and the appended claims include any radial directions or directions which are substantially horizontal or vertical or in substantially intermediate planes. The movements of the rockable frame and of the unbalanced object, exemplified as the pulley, may also be called vibratory movements, these movements being automatic, due to the centrifugal action of the unbalanced condition or heavier side of the object being rotated.

Means for securing the object being balanced to the mandrel are exemplified as a tapered end 46 of the mandrel, about which an expanding sleeve 47 having an inner tapered face and an outer cylindrical face is received. The expanding sleeve consists of sections 48, 49, connected at opposite ends of the sleeve by means of webs 50, 51. A washer 52 is received about the tapered end of the shaft and contacts the outer end of the sleeve, a nut 53 being threaded about the threaded end 54 of said tapered end, forcing the sleeve inwardly for expanding the sleeve to contact the inner face of the bore of the pulley for centering the pulley with relation to the mandrel.

The mandrel is provided with a driven pulley 58. A driving pulley 59 is provided. The pulleys are arranged to receive a belt 60 thereabout. The pivotal axis of the rocker-frame and the axes of rotation of the pulleys are in substantially a right line when the object on the mandrel is in balanced condition or is at rest.

Means are provided for resiliently resisting the vibratory movements of the object being balanced, for controlling said movements, and causing the same to be preferably in harmony with the speeds of rotation of the object being balanced, or to prevent undue lengths of vibratory movements thereof. These means are shown as acting upon the rocker-frame, and consisting of springs 62, 63, one of the ends of which are respectively received in sockets 64, 65, of the rocker-frame 22, and the other of the ends of which are received in sockets 66, 67, of slides 68, 69, slidable respectively on guides 70, 71, of the main frame. Adjusting screws 72, 73, coact with nuts 74, 75, on said slides, and are journaled in bearings 76, 77, in the frame, being held endwise in said bearings. Handles 78, 79, are on their respective adjusting screws for adjusting the same.

The reducing tool, shown as the grinding wheel 41, is adjustable toward and from the mandrel, preferably inside the periphery of the object being balanced. It is shown secured in suitable manner to a shaft 81 extending from and rotated by an electric motor 82 secured to a slide 83 adjustable on guides 84 on a bracket 85 of the main frame. An adjusting screw 86 is threaded in a nut 87 of the slide 83, and is journaled in a bearing 88 of the bracket, being held endwise in said bearing. A handle 89 adjusts the screw.

Adjustments are also provided for adjusting the reducing tool axially and for adjusting its angular relation to the object. Thus the frame of the electric motor is provided with lugs 91, having slots 92 therein, through which securing bolts 93 are threaded into the slide 83.

Means are provided for indicating the lateral positions of the mandrel with relation to its normal position due to balanced condition of the object or a state of rest of the members. Thus I provide a gage 96, which may be a usual pressure gage, provided with an index 97 and an indicating finger 98, to normally register with the zero mark of the index. The gage is provided with a plunger 99, arranged to be acted on by a movable part of the laterally movable support.

The movements of the plunger cause registering of the degree or extent of movements upon the pressure gage. This contact is preferably adjustable, for instance, by providing an adjusting bolt 100 threaded into the rocker-frame and held in adjusted positions by a jam-nut 101. The pressure gage has a bearing 102 on a stem 103 thereof. This bearing is received about a post 104, and secured in desired position lengthwise of the post by a set-bolt 105. The post is suitably secured to the main frame of the machine.

Lateral movements of the rocker-frame are indicated on the pressure gage to indicate the out of balance condition of the object being balanced. The resting of the finger of the pressure gage at zero indicates a balanced condition of the object. The finger is also at zero when the parts are at rest.

I prefer that the object be balanced while rotating at a speed which is slightly greater than the speed at which the object is intended to rotate when in use. Means are, therefore, provided for adjusting the speeds of rotation of the mandrel 27, exemplified as provided by mounting the driving pulley 59 upon the hub 108 of a friction-disk 109, for causing combined rotation of the pulley and the friction-disk. A friction-wheel 110 coacts with the friction-disk. It has spline and groove connection 111 with a shaft 112 journaled in bearings 113 of brackets 114 extending from the frame. An electric motor 115 is shown connected with the shaft 112 by means of a coupling 116.

A screw-shaft 120 is journaled in bearings 121 of the brackets 114, and has a nut 122 threaded thereon. The nut has a fork 123 extending therefrom. The fork is received in an annular groove 124 of a hub 125 of the friction-wheel 110. A hand-wheel 126 is employed for rotating the screw-shaft. Adjustment of the friction-wheel toward the axis of rotation of the friction-disk results in decreased speed of rotation of the mandrel 27, and adjustment of said friction-wheel toward the outer periphery of said friction-disk results in increased speed of said mandrel. The friction-disk is journaled on a shaft 127 secured in bearings 128 of the main frame. A spring 129 between said friction-disk and a ball-bearing 130 about the shaft at the frame normally urges driving contact between the friction-disk and the friction-wheel.

A speed-indicator 132 of desired construction is provided for indicating the speed of the mandrel and is preferably so placed, as on a post 133 on the main frame, as to be visible by the operator of the screw-shaft 120 when turning the hand-wheel 126. The speed-indicator comprises an index 134, with which a finger 135 coacts to indicate the speed of the mandrel. The mandrel is provided with a gear 138 fast thereon, which meshes with a pinion 139 on a flexible shaft 140, the other end of said flexible shaft being secured to the initial rotating member of the speed-indicator 132.

Having thus fully described my invention, what I claim as new and desire to secure by Letters Patent, is:

1. The method of balancing a rotating unbalanced object which consists in associating a reducing means with said rotating unbalanced object and causing automatic vibration of said rotating unbalanced object by the centrifugal force of its unbalanced condition for coaction between it and said reducing means to reduce said object at its heavier side.

2. The method of balancing an unbalanced object which consists in rotating said unbalanced object at a speed as great as the speed at which said object is to rotate during use, associating a reducing means with said rotating unbalanced object and causing automatic vibration of said rotating unbalanced object by the centrifugal force of its unbalanced condition for coaction between it and said reducing means to reduce said object at its heavier side.

3. The method of balancing an unbalanced object which consists in rotating the object being balanced to cause vibration thereof due to its unbalanced condition into alternate coaction of its heavier side with a reducing means whereby the heavier side of said unbalanced object is reduced for balancing said object.

4. The method of balancing an unbalanced object which consists in rotating the unbalanced object being balanced in proximity with a reducing means in manner to restrain the paths of vibratory movements of said object induced by its unbalanced condition while rotating for causing successive contacts between said rotating unbalanced object and said reducing means.

5. The method of balancing an unbalanced object which consists in rotating the object being balanced in proximity with a reducing means in manner to fix the paths of vibratory movement of said object induced by its unbalanced condition while rotating and increasing the speeds of rotation of said object.

6. The method of balancing an unbalanced object which consists in rotating said unbalanced object in association with a reducing means and imparting vibrations to said object induced by the centrifugal force of the unbalanced condition thereof and controlling the vibration into prescribed paths for repeated coactions between the heavier side of said rotating unbalanced object and said reducing means.

7. The method of balancing an object which consists in associating a reducing means with said unbalanced object and rotating said unbalanced object in manner to cause vibrations thereof induced by the centrifugal force of the unbalanced condition of said rotating unbalanced object while confined in given paths for causing successive coactions between said rotary unbalanced object and said reducing means to reduce the heavier side of said object whereby to balance said object.

8. In a balancing machine, the combination of a rotatable member to support the object being balanced, means for rotating said rotatable member, automatically vibrating means for supporting said rotatable member constructed for vibratory movements of said rotatable member by unbalanced condition of an object being balanced thereon, a reducing tool, and means causing reducing relation between said reducing tool and said object being balanced.

9. In a balancing machine, the combination of a rotatable member to support the object being balanced, means for rotating said rotatable member, means for supporting said rotatable member constructed to allow vibratory movements of said rotatable member under the influence of unbalanced condition of an object being balanced thereon, a reducing tool, means causing reducing relation between said reducing tool and said object being balanced, and a gage actuated by said lateral movements to determine the out of balance conditions of said object.

10. In a balancing machine, the combination of a rotatable member to support the object being balanced, means for rotating said rotatable member, means for supporting said rotatable member constructed to allow vibrating movements of said rotatable member by unbalanced condition of an object being balanced thereon, resilient means for resisting said vibrating movements, a reducing tool, and means causing reducing relation between said reducing tool and said object being balanced.

11. In a balancing machine, the combination of a rotatable member to support the object being balanced, means for rotating said rotatable member, a reducing tool in association with said rotatable member, supporting means for supporting said rotatable member constructed to allow vibrating movements of said rotatable member by unbalanced condition of said object being balanced thereon in such manner that reducing relation between said reducing tool and said object being balanced is thereby effected, and means for changing the speed of rotation of said rotatable member.

12. In a balancing machine, the combination of a rotatable member to support the object being balanced, means for rotating said rotatable member, automatically vibrating means for supporting said rotatable member constructed to allow vibratory movements of said rotatable member by unbalanced condition of said object being balanced thereon, a reducing tool, means for causing reducing relation between said reducing tool and said object being balanced, means for changing the speed of rotation of said rotatable member, and a speed-indicator having operative connection with said rotatable member.

13. In a balancing machine for balancing an object by reducing its inner periphery, the combinations of a rotatable member, means for rotating said rotatable member, vibratory means for supporting said rotatable member constructed to allow vibrating movements of said rotatable member by unbalanced condition of said object being balanced thereon, a reducing tool, and means for supporting said reducing tool at the inner periphery of said object.

14. In a balancing machine for balancing an object by reducing its inner periphery, the combination of a rotatable member, means for rotating said rotatable member, vibratory means for supporting said rotatable member to cause automatically vibrating movements of said rotatable member by unbalanced condition of said object being balanced thereon, a reducing tool, means for supporting said reducing tool at the inner periphery of said object, and means for adjusting the lateral relation between said reducing tool and the path of said axis of rotation.

15. In a balancing machine for balancing an object by reducing its inner periphery, the combination of a rotatable member, means for rotating said rotatable member, vibratory means for supporting said rotatable member to cause automatically vibrating movements of said rotatable member by unbalanced condition of said object being balanced thereon, a reducing tool, means for supporting said reducing tool at the inner periphery of said object, means for adjusting the lateral relation between said reducing tool and the path of said axis of rotation, and means for changing the speed of rotation of said rotatable member.

16. In a balancing machine for balancing an object by reducing its inner periphery, the combination of a rotatable member for supporting said object, an automatically rockable frame on which said rotatable member is journaled, means for rotating said rotatable member, a slide, means for adjusting said slide toward and from said rockable frame, and supporting means on said slide for a reducing tool for positioning said reducing tool at said inner periphery.

17. In a balancing machine for balancing an object by reducing its inner periphery, the combination of a rotatable member for supporting said object, an automatically rockable frame on which said rotatable member is journaled, means for rotating said rotatable member, resilient means for controlling the rockable movements of said rockable frame, a slide, means for adjusting said slide toward and from said rockable frame, and supporting means on said slide for a reducing tool for positioning said reducing tool at said inner periphery.

18. In a balancing machine for balancing an object by reducing its inner periphery, the combination of a rotatable member for supporting said object, a driven pulley thereon, a rockable frame on which said rotatable member is journaled, a driving pulley, said pulleys arranged for receiving a belt thereabout, said rockable frame having a pivotal axis in substantially the plane in which the axes of rotation of said pulleys are normally located, resilient means resisting rocking movements of said rockable frame, and a reducing tool arranged to coact with said object.

19. In a balancing machine for balancing an object by reducing its inner periphery, the combination of an automatically rockable frame whose rocking is automatically caused by a rotating object out of balance thereon, a rotatable member for supporting said object journaled in said rockable frame, a slide, an electric motor thereon comprising a shaft, a grinding wheel on said shaft inside the location of the periphery of said object, and means for adjusting said slide toward and from said rotatable member.

20. In a balancing machine for balancing an object by reducing its inner periphery, the combination of an automatically rockable frame whose rocking is automatically caused by a rotating object out of balance thereof, a rotatable member for supporting said object journaled in said rockable frame, a slide, an electric motor thereon comprising a shaft, a grinding wheel on said shaft inside the location of the periphery of said object, means for adjusting said slide toward and from said rotatable member, resilient means for controlling the rocking movements of said frame, and means for adjusting said resilient means.

21. In a balancing machine for balancing an object by reducing its inner periphery, the combination of an automatically rockable frame whose rocking is automatically caused by a rotating object out of balance thereon, a rotatable member for supporting said object journaled in said rockable frame, a slide, an electric motor thereon comprising a shaft, a grinding wheel on said shaft inside the location of the periphery of said object, means for adjusting said slide toward and from said rotatable member, resilient means for controlling the rocking movements of said frame, means for adjusting said resilient means, and means for changing the speeds of rotation of said rotatable member.

22. The method of balancing an object which consists in rotating an unbalanced object in association with a reducing means to cause vibrations of said unbalanced object due to the centrifugal force of its unbalanced condition in manner so that the center of gravity of said object vibrates past its axis of rotation alternately in opposite directions whereby to cause coaction between the heavier side of said unbalanced object and said reducing means.

23. The method of balancing an unbalanced object which consists in rotating the unbalanced object in association with a reducing means to cause vibrations of said unbalanced object due to the centrifugal force of its unbalanced condition in manner so that the center of gravity of said object vibrates past its center of rotation alternately in opposite directions, whereby the heavier side of said unbalanced object and said reducing means are successively brought into coactive relation for successive closer approaches between said center of gravity and said axis of rotation for ultimate coincident location of said center and said axis due to the reducing action of said reducing means.

In testimony whereof, I have hereunto signed my name in the presence of two subscribing witnesses.

AUGUSTUS M. SOSA.

In presence of—
DELMA WERNSING,
PAUL V. CONNOLLY.